United States Patent
Mo et al.

(10) Patent No.: US 11,949,742 B2
(45) Date of Patent: Apr. 2, 2024

(54) CONDITION MONITORING SYSTEM AND METHOD

(71) Applicant: SIEMENS AKTIENGESELLSCHAFT, Munich (DE)

(72) Inventors: Kristian Mo, Trondheim (NO); Vegard Kleppe Torkelsen, Oslo (NO)

(73) Assignee: Siemens Aktiengesellschaft, Munich (DE)

( * ) Notice: Subject to any disclaimer, the term of this patent is extended or adjusted under 35 U.S.C. 154(b) by 373 days.

(21) Appl. No.: 17/442,836

(22) PCT Filed: Mar. 28, 2019

(86) PCT No.: PCT/EP2019/057950
§ 371 (c)(1),
(2) Date: Sep. 24, 2021

(87) PCT Pub. No.: WO2020/192937
PCT Pub. Date: Oct. 1, 2020

(65) Prior Publication Data
US 2022/0311825 A1 Sep. 29, 2022

(51) Int. Cl.
*H04L 67/125* (2022.01)
*H04W 4/38* (2018.01)
*H04W 52/02* (2009.01)

(52) U.S. Cl.
CPC .......... *H04L 67/125* (2013.01); *H04W 4/38* (2018.02); *H04W 52/0251* (2013.01)

(58) Field of Classification Search
CPC ..... H04L 67/125; H04L 41/00; H04L 67/025; H04W 4/38; H04W 52/0251;
(Continued)

(56) References Cited

U.S. PATENT DOCUMENTS

| 2012/0063397 A1 | 3/2012 | Abedi et al. |
| 2012/0119902 A1 | 5/2012 | Patro et al. |

(Continued)

FOREIGN PATENT DOCUMENTS

| DE | 102012200267 A1 * | 7/2013 | ........... B62D 15/021 |
| DE | 102012200267 A1 | 7/2013 | |
| EP | 3336634 A1 | 6/2018 | |

OTHER PUBLICATIONS

International Search Report and the Written Opinion for International Patent Application PCT/EP2019/057950 dated Oct. 28, 2019.
(Continued)

*Primary Examiner* — Mewale A Ambaye
(74) *Attorney, Agent, or Firm* — Lempia Summerfield Katz LLC (57) ABSTRACT

A method of condition monitoring for a device, the method including determining a desired state of the device, or event, at which sensor data is to be obtained; determining an indicator indicating the desired state or event; monitoring for the indicator; sending an instruction to one or more sensors associated with the device to trigger activation of the sensor when the desired state or event has occurred, as indicated by the indicator; receiving data from the activated sensor; and returning the sensor to a sleep mode after the data has been received from the sensor.

12 Claims, 3 Drawing Sheets

(58) Field of Classification Search
CPC ..... H04W 36/00; H04W 36/36; H04W 52/02; H04W 4/80; H04W 4/021
See application file for complete search history.

(56) References Cited

U.S. PATENT DOCUMENTS

| | | | |
|---|---|---|---|
| 2016/0316443 A1* | 10/2016 | Otomo | H04W 52/0219 |
| 2017/0105057 A1 | 4/2017 | Stamatakis et al. | |
| 2018/0139698 A1* | 5/2018 | Quinlan | H04Q 9/00 |
| 2022/0046750 A1* | 2/2022 | Jeon | H04W 36/305 |
| 2022/0132587 A1* | 4/2022 | Agiwal | H04W 76/27 |
| 2022/0210707 A1* | 6/2022 | Lim | H04W 48/16 |

OTHER PUBLICATIONS

Notice of Transmittal of the International Patentability Report on Patentability for International Patent Application No. PCT/EP2019/057950 dated Jun. 17, 2021.

* cited by examiner

FIG 1

CONDITION MONITORING SYSTEM AND METHOD

CROSS REFERENCE TO RELATED APPLICATIONS

This present patent document is a § 371 nationalization of PCT Application Serial Number PCT/EP2019/057950 filed on Mar. 28, 2019, designating the United States, which is hereby incorporated in its entirety by reference.

FIELD

Embodiments relates to a condition monitoring system and a method of operating the system.

BACKGROUND

Condition monitoring of equipment, for example rotating machines is becoming increasingly important, for example in extending operational lifetime by enabling appropriate maintenance to be carried out and early detection of faults that might lead to longer downtime, or damage to other parts. Conventional condition monitoring has relied on the use of industrial sensors fitted to equipment and using mains power. The sensors may take readings continuously, or at fixed intervals. However, this type of industrial sensor, although effective, is expensive. Increasing cost pressures have led to the use of battery powered sensors, but the battery lifetime is limited, requiring recharging or replacement, so it is desirable to be able to prolong the battery life to reduce the frequency with which recharging or replacement needs to be done.

Typically, industrial condition monitoring sensors have been set up to read sensor data at regular intervals, such as every 5 minutes, or every 10 minutes, throughout the day. Some systems using battery powered sensors, but based on such fixed interval methods, have tried to address the issue of improving battery lifetime of the sensors by still sampling periodically, but changing the period based on certain inputs. For example, U.S. Pat. No. 8,416,726 describes wireless sensors devices in a network that has high-power and low-power modes and toggles to low-power mode for longer periods if the conditions are such that the devices might otherwise consume more power. Another approach has been to allow nodes of a wireless sensor network to determine their sleep schedule independently, so that they may save energy if needed, such as described in U.S. Pat. No. 9,986, 502, or to have wake up circuitry that means the sensor only wakes up when a request to use the sensor is received, as described in US20180139698.

However, these systems do not address a further problem that occurs with rotating machines, that is the significant variability of the operational behavior of the system being monitored. An improved condition monitoring system and method is desirable.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a method of condition monitoring for a device that includes determining a desired state of the device, or event, at which sensor data is to be obtained; determining an indicator indicating the desired state or event; monitoring for the indicator; sending an instruction to one or more sensors associated with the device to trigger activation of the sensor when the desired state or event has occurred, as indicated by the indicator; receiving data from the activated sensor; and returning the sensor to a sleep mode after the data has been received from the sensor.

The indicator may include a Boolean operator, or a bit in a database, for example, a time series database.

The data received from the activated sensor may be stored in the database.

The method may further include determining from the instruction whether further data is required from the sensor and if so, activating the sensor and receiving the further data before instructing the sensor to return to a sleep mode.

The desired state may include a state that is achieved a predetermined number of times in one operational cycle.

Embodiments provide a computer implemented method for performing predictive maintenance of an industrial device, the method including carrying out condition monitoring according to the method; comparing the data received from the activated sensor with stored reference data; and sending a notification if the result of the comparison indicates maintenance or repair is required.

Embodiments provide a condition monitoring system for performing condition monitoring of a device for fault diagnosis or predictive maintenance includes a plurality of components configured to perform condition monitoring operations according to the method, the components including a database and a store for storing condition monitoring sensor data.

The components may include software components, or a combination of software and hardware components.

The database may include a time series database.

The system may further include reference data and a comparator for comparing the condition monitoring sensor data and the reference data.

The system may further include one or more processors, or cloud-based processing facilities, or a combination thereof, configured to execute the plurality of software components.

The system may include a multi-sensor data device for collecting equipment-specific condition data for analysis.

The multi-sensor device may include a plurality of sensors for the communication of operational parameters, for example vibration sensors, temperature sensors, or speed sensors; a wireless communications module; and a battery.

Embodiments provide a method of operating a multi-sensor data collection device including a plurality of sensors for the communication of operational parameters, for example vibration sensors, temperature sensors, or speed sensors; a wireless communications module; and a battery, the method including receiving an instruction to trigger one or more of the sensors associated with equipment being monitored; the instruction being received when a determined or desired state of the equipment, or event, at which sensor data is to be obtained, occurs, in response to an indicator indicating the desired state of the equipment, or event having occurred; and receiving in the same or a subsequent instruction, an instruction to return the sensor to a sleep mode after the data has been received from the or each sensor.

BRIEF DESCRIPTION OF THE FIGURES

An example of a condition monitoring system and associated method of operation in accordance with one or more embodiments are described with reference to the accompanying drawings.

DETAILED DESCRIPTION

As referred to above conventional battery powered sensor systems do not address variability of the operational behavior of the system being monitored. Networked wireless sensor nodes, such as those referred to above consider how to reduce the frequency of transmission and assume that the data may be obtained at the revised intervals. By contrast, for condition monitoring or predictive maintenance applications in mechanical equipment, such as in a rotating machine, there may be large numbers of variables that affect the sensor data that is being collected and those variables are inconsistent. For example, in a motor of a rotating machine, vibration of the machine and associated equipment, current consumption, and/or temperature at which the machine is operating may all be different depending on the load under which the motor is operating. When mains powered industrial sensors were the norm, this was not an issue, as data might be read continuously and the results processed subsequently to take account of the variability. To be able to properly apply such data to condition monitoring, or predictive maintenance, it is important to ensure that the data is sampled when the system is in a similar state, for instance always taking measurements when the motor is under no external load. Therefore, the state of the system during sampling needs to be taken into account when requesting the time at which a sensor measurement is made.

Although samples taken at fixed intervals may be split into usable, or not usable, samples by data processing, this still does not address the need to take the same under repeatable conditions. In an extreme case, fixed sampling intervals with a constraint that useful data is only obtained when the system is not under load, might not actually result in a sample being taken at a point when the machine is not under any external load, if that condition is a relatively rare one. In any case, large numbers of the samples might not be usable, that is wasteful with respect to battery consumption.

Embodiments change the sampling basis to pick a specific event, e.g., when the equipment is not under load. A database, for example a time series database, is monitored to determine when a Boolean value, or bit, occurs that describes the equipment being in the desired state for monitoring. The Boolean value, or bit, in question depends on the equipment itself and chosen based on knowledge of the equipment and its functionality. The Boolean value, or bit, is one that is able to indicate whether the equipment is in a particular state that would mean that a measurement provided the required data. If measurements are made when the equipment is not in the correct state, then they may not be of any use for further processing. When the equipment reaches the desired state, then a script is triggered to do an API call to the server, effectively telling the server to make the measurement. For relatively infrequent events, relying on fixed sampling intervals, or intervals, that may be varied, but are not based on any particular state of the machine, as in the prior art, might actually never result in a measurement being taken in the desired state.

Embodiments address these problems by combining event-based triggering with periods of inactivity, so that the sensors are only active when a measurement is likely to be needed and only make a measurement when a predetermined event takes place. Embodiments address this problem by monitoring a specific indicator of status and using this to improve the chances that the measurements are made consistently when the machine is in the chosen status. Status indicators may take many forms, for example, when the machine is in a "steady state" such as, for a variable speed drive, having reached its speed setpoint, in which case the Boolean for the measurement would then be IF (error<threshold).

Alternatively, the equipment may run in several different "states," conducting specific tasks in each given state, so carrying out the monitoring and measuring when the machine goes from one state to another state may provide or give good indicators as to how the equipment is performing in the specific states. This state change option is applicable to most types of measurements, including vibration, temperature, current, or pressure of the equipment as a whole, the environment in which it is fitted, or specific parts of the equipment, according to the application.

However, the most convenient status indicator is a bit from a database. The bit to be monitored is chosen to be one that most closely correlates with a predetermined state of the equipment. One type of database that may be used is a time series database. This type of database stores timeseries data, meaning that for every measurement, there is a measured value, (and may include measurement quality and meta data) and a corresponding timestamp, indicating when the measurement was conducted. However, other types of databases may be used provided that the data may be obtained when the equipment or machine is in the correct state and stored in a retrievable manner.

Figure 1:
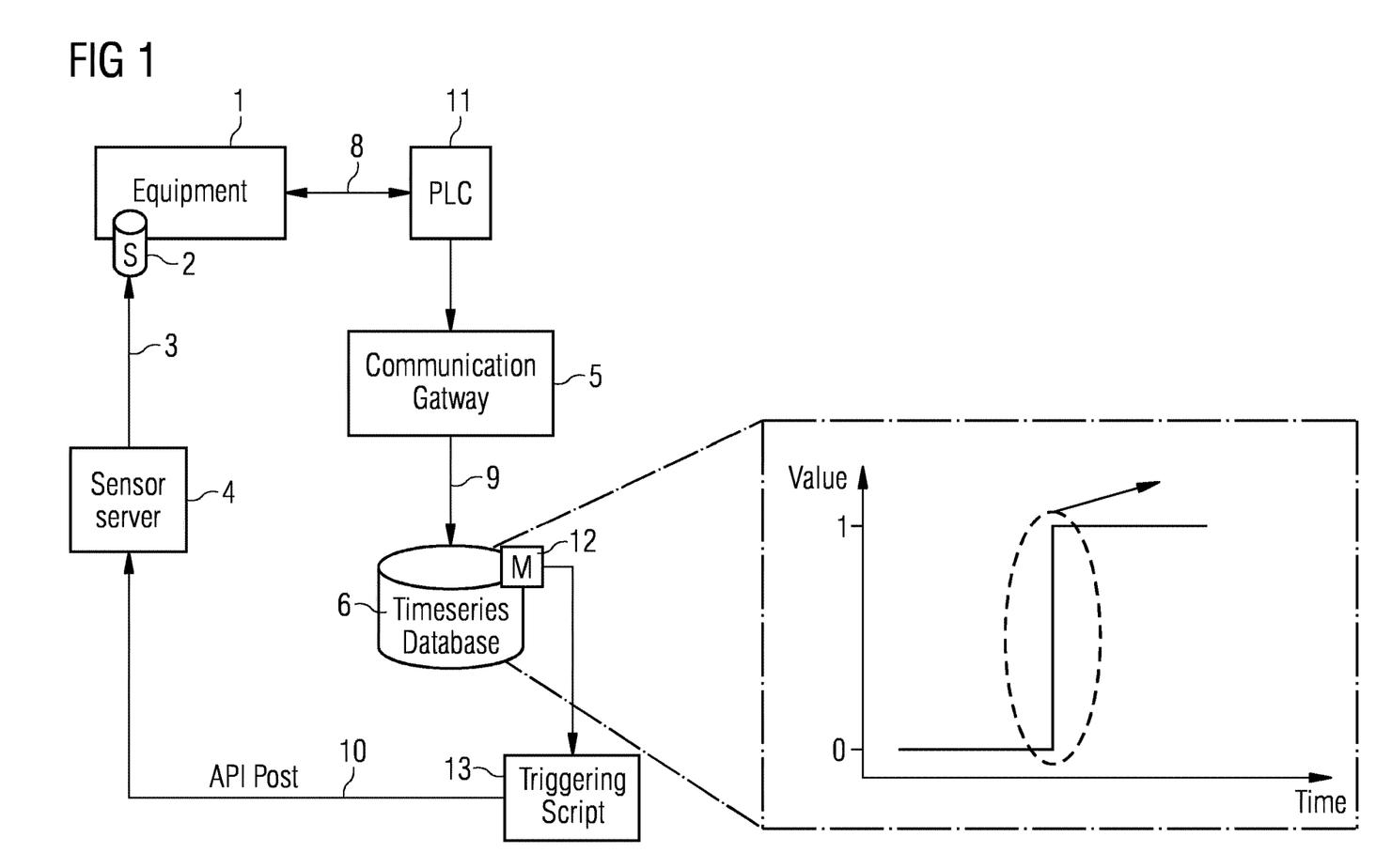
FIG. 1 depicts a block diagram of an example of a system according to an embodiment.
Figure 2:
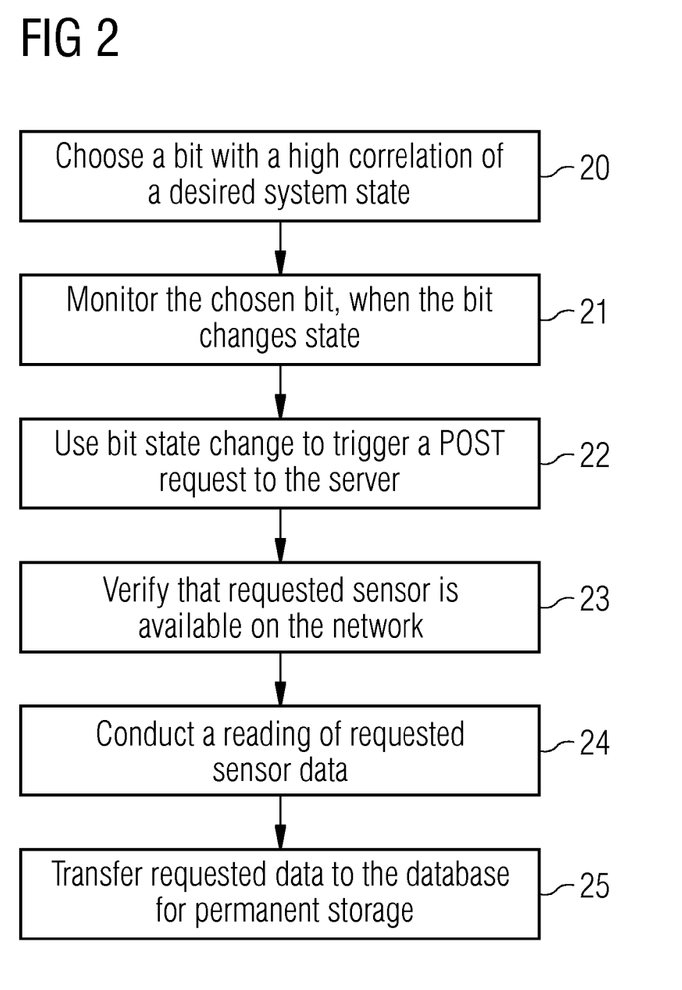
FIG. 2 depicts a flow diagram of a method of operating a condition monitoring system according to an embodiment.

A Boolean value or a bit (0,1) may be set that determines whether or not a measurement should be conducted. The Boolean value may be customized as needed in the script that monitors the database. For example, when determining whether to make a vibration measurement in a system that carries out a milling process, a bit (Boolean value; 0 or 1) that indicates whether the equipment has completed the milling process at this time is used, i.e., a specific value is being directly monitored. In other examples it may be necessary to calculate the Boolean that is to be monitored, for example, if the measurement is to be made when the motor has reached a steady state (i.e., the speed has reached its setpoint) then it may be necessary to convert two variables (speed and setpoint) into a single Boolean value, that is simply done by:

If ((absolute(speed−setpoint)~0):
   measureValue=True
Else:
   measureValue=False Thus, embodiments change the sampling basis from a fixed time, as used in prior art systems and methods, to a selected specific event. One example of a suitable event at which to monitor the system is when the equipment, or machine, is not under load. Other events may include steady state or completion of a specified process, as described above FIG. 1 depicts a block diagram to illustrate a system in which the method may be applied. FIG. 2 is a flow diagram of an example of the method. Certain equipment 1 is provided with one or more wireless sensors 2 to sense data related to the condition of the equipment, such as vibration, that is typically determined by measuring acceleration, or the condition may be determined from data relating to temperature, or current. More generally, any measurable that may be measured using internet of things (IOT) sensors may be selected according to the application. The wireless sensors 2 communicate, via a wireless communication network 3, with a server 4. The wireless sensors may be implemented as a multi-sensor data collection device for collecting equipment-specific condition data ready for analysis to determine, for example such a multi-sensor device may be mounted on the equipment being monitored, for example, mounted to a motor to determine motor health conditions. Other applications include fleet management, providing a performance overview or electronic rating plate. The multi-sensor device may include a plurality of sensors for obtaining data relating to operational parameters, a WLAN communications module, and a battery for the power supply. The sensors may determine conditions such as vibration, cooling status, or speed, for example by an onboard temperature sensor, a 3-axis vibration sensor, an acceleration sensor and a 1-axis magnetic sensor. The communications module may include a Bluetooth or Wi-Fi interface.

The server may be a third-party server, for example one provided by a third-party company responsible for provision of the sensors on the equipment, or maintenance of the equipment, or may be a server that is operated by the same party as the equipment. The server receives communications 10, for example instructing that a reading is to be taken and the server 4 in turn communicates with the sensors 2. Communication of instructions to the server typically uses an application programming interface (API). The wireless communication network 3 may be an industrial process network. Associated with the equipment 1, normal operational data, for example in a processor of a programmable logic controller (PLC) 11, or cloud-based system, is generated and transferred from the PLC of the equipment 1, from the multi-sensor data collection device 2 or from the cloud, to, in this example, a time series database 6 by a communication gateway server 5. Each transfer, from the equipment 1 to the communication gateway server 5 and from the communication gateway server 5 to the time series database 6 involves a bit state change 8, 9. The server 4 may be ordered to trigger measurements of a specific sensor 2 in the equipment, through the API that is available on the network, by sending an API post command 10.

The system includes a database 6 in which the readings from the sensors 2 are stored. This information is transferred to the database 6, that may be any timeseries database, for example an influx database, through the communication gateway 5. Triggering of the sensor readings includes a number of steps. A bit with a high correlation to a particular system state is chosen 20, for example a bit correlated with a system state of "no load", although other states may be chosen. The chosen bit is then monitored 21, for example using a structured query language (SQL) script 12. Whenever the monitored bit changes state, i.e., goes from low to high, or high to low, this change may be detected to indicate that a specific part of the process has been completed. For the "no load" example, that refers to when a motor is running without any external load for a certain amount of time. For the milling process example, then the reading is triggered 13 when the equipment has finished milling an anode. Then the equipment prepares the next anode (i.e., moves it into the milling "chamber" so it is ready to be milled). This bit state change 8 is then used to trigger a simple executable 13 that sends 22 a POST request 10 to the server 4 to trigger a sensor measurement of a specific sensor 2.

In addition, if required, the executable is used to verify 23 that the requested sensor is available on the network, and the executable will limit the number of times that the sensor is triggered to a configurable value to further lower battery usage. For example, the measurement may be made only a certain number of times per day in order that the measurement is made no more often than necessary to have receive the appropriate amount of data to conduct the condition monitoring of the given equipment. In this way enough data is obtained to perform analytics, yet the battery consumption is kept as low as possible. The script allows the user to configure the number of measurements to be conducted. Once this number has been achieved, the script will not conduct another measurement, even if the monitored bit has gone from low to high (0 to 1). After the sensor 2 has conducted 24 a reading, as requested, a subscription system in the communication gateway 5 ensures that the new sensor data is properly transferred 25 to the database 6 for permanent storage. By monitoring for a known system state and ensuring that the sensor readings are taken at that known system state, the battery life of the sensors is greatly increased.

The feature of monitoring a database to determine when a bit occurs that describes the equipment being in the desired state for monitoring and when the equipment reaches the desired state, then triggering a script to do an API call to the server, effectively telling the server to make the measurement, helps prolong the life of the battery in the sensor. This is because the chosen trigger event means that the measurements may only need to be made a limited number of times in any operational cycle. For example, operation may be based on a daily routine, or fractions of a day, such as between 12 hours and 36 hours, for example 24 hours and within the chosen cycle the event may only occur occasionally, for example fewer than 5 times in a day and those occurrences may not be evenly spread over the course of the day, for example, they may be separated by minutes, or up to an hour. Thus, if the event only occurs once or twice a day (in a machine where it only exhibits the desired state infrequently) and the sensors are then put to sleep for an extended period until the following day, or the start of the following measurement period, if not based on a daily cycle, then significant savings in battery usage may be achieved compared to a fixed or regular interval-based method. In the next measurement cycle, the sensor may wake up at regular intervals to check whether it has received an instruction from the server 4 to take a measurement, but once the sensor 2 has done the required measurement, then the sensor will be instructed by the server 4 to take a long sleep until the next measuring check period begins, typically the following day for systems running 24/7. This helps the battery to retain energy and reduces the frequency with which it needs to be recharged or changed. Monitoring the representative bit and using a change of state of that bit to trigger a sensor measurement through an API, increases the probability that the sensor measures each time when the system is in a similar system state, such as no load.

Condition monitoring or predictive maintenance of the machine may then be achieved by using the obtained sensor data in a software-based system, along with stored data that provides reference conditions of operation. Deviations from the expected readings may be classified and when they exceed a certain range, or threshold, a notification may be sent indicating what action is required, such as inspection of the part, regular maintenance, such as lubrication or replacement of a part or a consumable.

Figure 3:
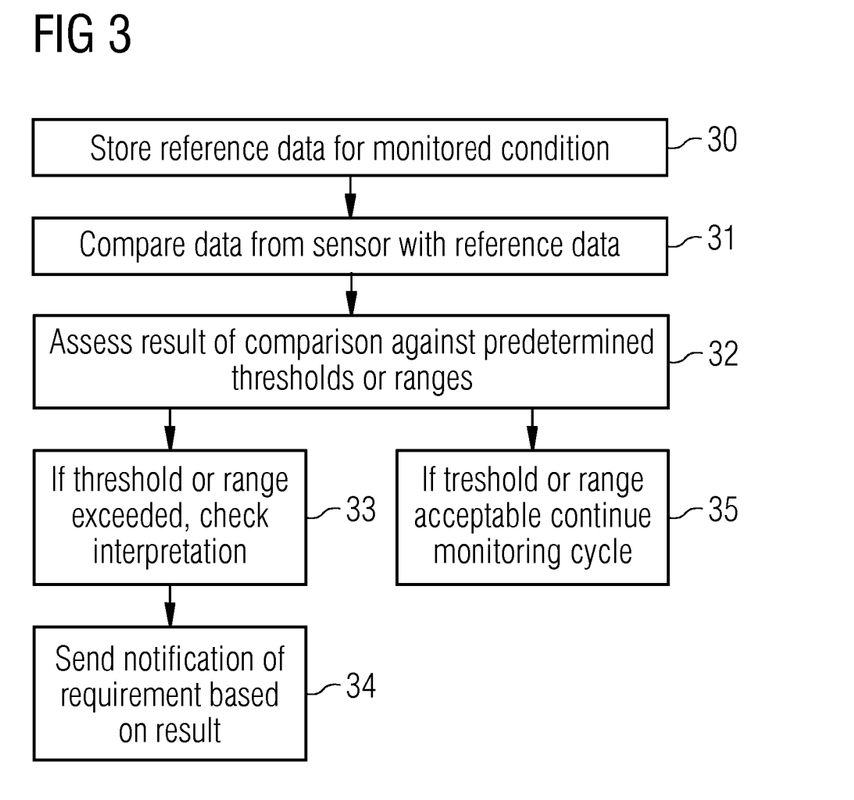
FIG. 3 depicts a flow diagram of a method of predictive maintenance based on the condition monitoring method of FIG. 2 according to an embodiment.

FIG. 3 illustrates a basic method of predictive maintenance, making use of the sensor data obtained during condition monitoring, for example, as described above with respect to FIG. 2. Specific analytics are performed for predictive maintenance dependent upon the type of sensor data that is available and the type of equipment that is being monitored. Using the method helps to provide that the correct data is obtained, so that the predictive maintenance analytics may be performed. In the example of FIG. 3, reference data is stored 30 that relates to the condition and equipment being monitored.

The sensor data that was read 24 during the monitoring phase may be compared 31 with the stored reference data and the result of the comparison assessed 32 against a predetermined threshold, or a range. If the threshold or range is exceeded 33, then further checks are made to determine the consequence and type of notification that is required as a result and that notification is sent 34. This notification may take various forms, such as providing information about the need for a maintenance event within a certain time frame, automatically ordering the consumable that must be replaced, if required, or an alarm indicating a severe fault that must be addressed immediately. If the result is within the predetermined threshold or range 35, then the monitoring cycle continues without further action.

While embodiments have been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It should be appreciated that acts associated with the above-described methodologies, features, and functions (other than any described manual acts) may be carried out by one or more data processing systems, such as for example a central control system, via operation of at least one processor. As used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. The processor may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor with the executable instructions (e.g., software/firmware apps) loaded/installed into a memory (volatile and/or non-volatile), that are currently being executed and/or are available to be executed by the processor to cause the processor to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configures to carry out the functions described herein. Further, it should be appreciated that a data processing system may also be referred to as a controller that is operative to control at least one operation.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++ or any other form of code that may be programmed/configured to cause at least one processor to carry out the acts and features described herein. Still further, results of the described/claimed processes or functions may be stored in a computer-readable medium, displayed on a display device, and/or the like It will be readily apparent that the various methods, algorithms, and modules disclosed herein may be implemented on computer readable media appropriately programmed for computing devices. The modules that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the modules including computer executable instructions may be implemented in any programming language. The modules may be stored on or in one or more mediums as object code. Various aspects of the method and system disclosed herein may be implemented in a non-programmed environment including documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof.

Where databases including data points are described, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries may be different from those disclosed herein. Further, despite any depiction of the databases as tables, other formats including relational databases, object-based models, and/or distributed databases may be used to store and manipulate the data types disclosed herein. Likewise, object methods or behaviors of a database may be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

Embodiments may be configured to work in a network environment including one or more computers that are in communication with one or more devices via a network. The computers may communicate with the devices directly or indirectly, via a wired medium or a wireless medium such as the Internet, cellular networks such as 4G or 5G and the like, a local area network (LAN), a wide area network (WAN) or the Ethernet, a token ring, or via any appropriate communications mediums or combination of communications mediums. Each of the devices includes processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

Embodiments are not limited to a particular computer system platform, processor, operating system, or network. One or more aspects of the embodiments may be distributed among one or more computer systems, for example, servers configured to provide one or more services to one or more client computers, or to perform a complete task in a distributed system. For example, one or more aspects of the embodiments may be performed on a client-server system that includes components distributed among one or more server systems that perform multiple functions according to various embodiments. These components include, for example, executable, intermediate, or interpreted code, that communicate over a network using a communication protocol. The embodiments are not limited to be executable on any particular system or group of systems, and is not limited to any particular distributed architecture, network, or communication protocol.

The foregoing examples have been provided merely for the purpose of explanation and are in no way to be construed as limiting of the embodiments disclosed herein. While the embodiments have been described with reference to various embodiments, it is understood that the words, that have been used herein, are words of description and illustration, rather than words of limitation. Further, although the embodiments have been described herein with reference to particular mechanisms, materials, and embodiments, the embodiments are not intended to be limited to the particulars disclosed herein; rather, the embodiments extend to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "including" does not exclude other elements or steps and "a" or "an" does not exclude a plurality. Elements described in association with different embodiments may be combined. It should also be noted that reference signs in the claims should not be construed as limiting the scope of the claims. Although the embodiments are illustrated and described in detail by the preferred embodiments, the embodiments are not limited by the examples disclosed, and other variations may be derived therefrom by a person skilled in the art without departing from the scope of the invention.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of condition monitoring for a device, the method comprising:
   determining a desired state of the device or event, at which sensor data is to be obtained;
   determining an indicator indicating the desired state or event, wherein the indicator comprises a bit in a time series database;
   monitoring for the indicator;
   sending an instruction to one or more sensors associated with the device to trigger activation of a sensor of the one or more sensors when the desired state or event has occurred, as indicated by the indicator;
   receiving sensor data from the activated sensor; and
   returning the sensor to a sleep mode after the sensor data has been received from the activated sensor.

2. The method of claim 1, wherein the sensor data received from the activated sensor is stored in the time series database.

3. The method of claim 1, further comprising:
   determining from the instruction that further data is required from the sensor; and
   activating the sensor and receiving the further data before instructing the activated sensor to return to the sleep mode.

4. The method of claim 1, wherein the desired state comprises a state that is achieved a predetermined number of times in one operational cycle.

5. The method of claim 1, further comprising:
   comparing the sensor data received from the activated sensor with stored reference data; and
   sending a notification if a result of the comparison indicates maintenance or repair is required.

6. A condition monitoring system for performing condition monitoring of a device for fault diagnosis or predictive maintenance; the system comprising:
- a database;
- a store for storing condition monitoring sensor data; and
- a processor configured to determine a desired state of the device or an event, at which sensor data is to be obtained, determine an indicator indicating the desired state or event, wherein the indicator comprises a bit in a time series database, monitor for the indicator, send an instruction to one or more sensors associated with the device to trigger activation of the a sensor of the one or more sensors when the desired state or event has occurred, as indicated by the indicator, receive sensor data from the activated sensor, and return the sensor to a sleep mode after the sensor data has been received from the activated sensor.

7. The system of claim 6, wherein the system further comprises a comparator for comparing the condition monitoring sensor data and reference data.

8. The system of claim 6, wherein the processor comprises one or more cloud-based processing facilities.

9. The system of claim 6, wherein the system further comprises a multi-sensor data collection device for collecting equipment-specific condition data for analysis.

10. The system of claim 9, wherein the device comprises one of a vibration sensor, a temperature sensor, or a speed sensor; a wireless communications module; and a battery.

11. A method of operating a multi-sensor data collection device comprising a plurality of sensors for a communication of operational parameters, the method comprising:
- receiving an instruction to trigger one or more of the sensors associated with equipment being monitored when a determined or desired state of the equipment, or event, at which sensor data is to be obtained, occurs, in response to an indicator indicating the desired state of the equipment, or event having occurred, wherein the indicator comprises a bit in a time series database; and
- receiving in the same or a subsequent instruction, an instruction to return the sensor to a sleep mode after the sensor data has been received from the or each sensor.

12. The method of claim 11, wherein each sensor of the plurality of sensors comprises one of a vibration sensor, temperature sensor, or speed sensor, a wireless communications module, and a battery.

* * * * *